No. 738,818. PATENTED SEPT. 15, 1903.
H. M. KING.
DISK PLOW.
APPLICATION FILED JUNE 15, 1903.
NO MODEL. 2 SHEETS—SHEET 2.
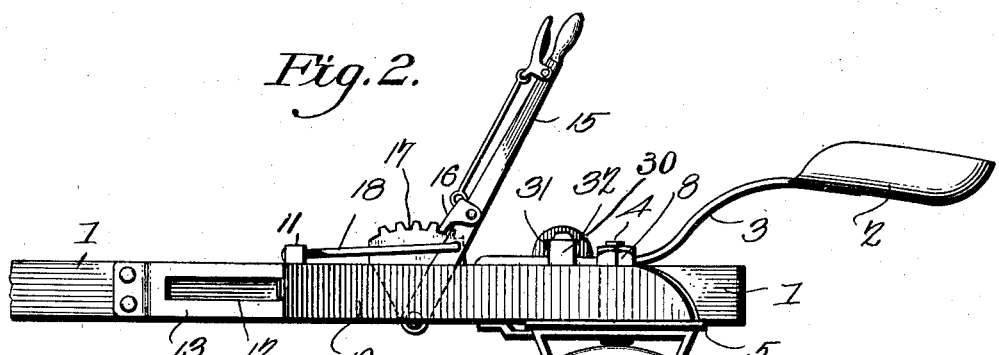
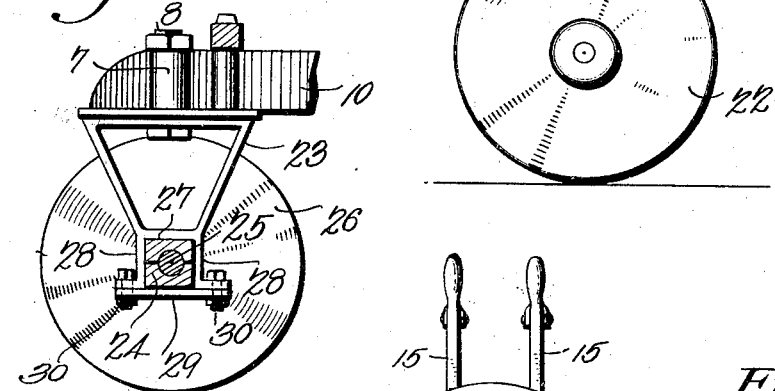
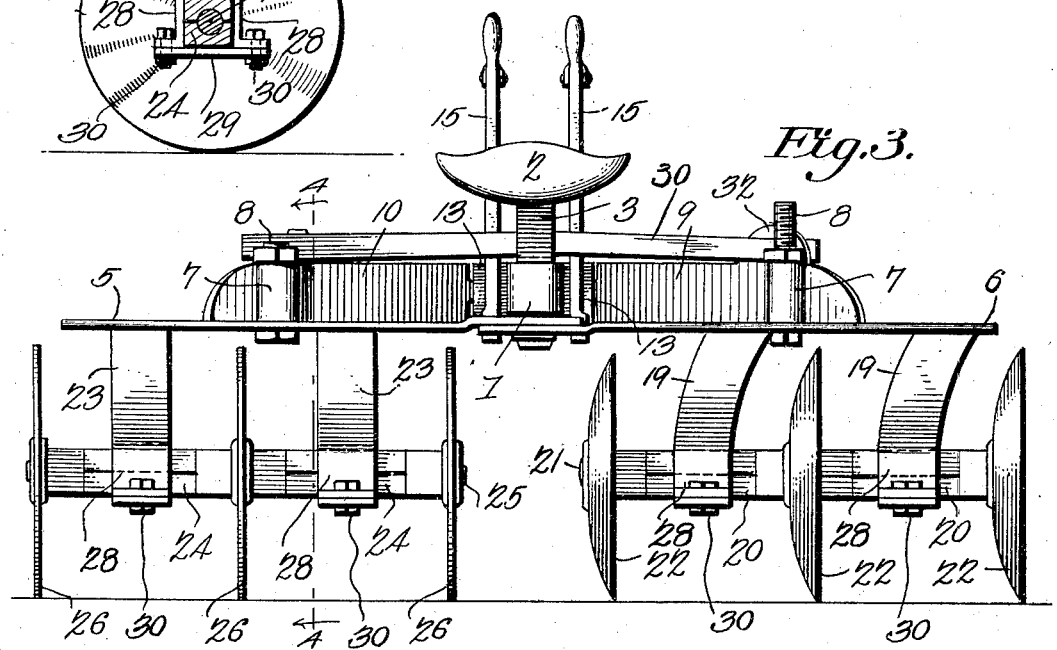
Witnesses
E. H. Stewart
Wm. Bagger
Hugh M. King, Inventor,
by C. A. Snow & Co.
Attorneys No. 738,818. Patented September 15, 1903.

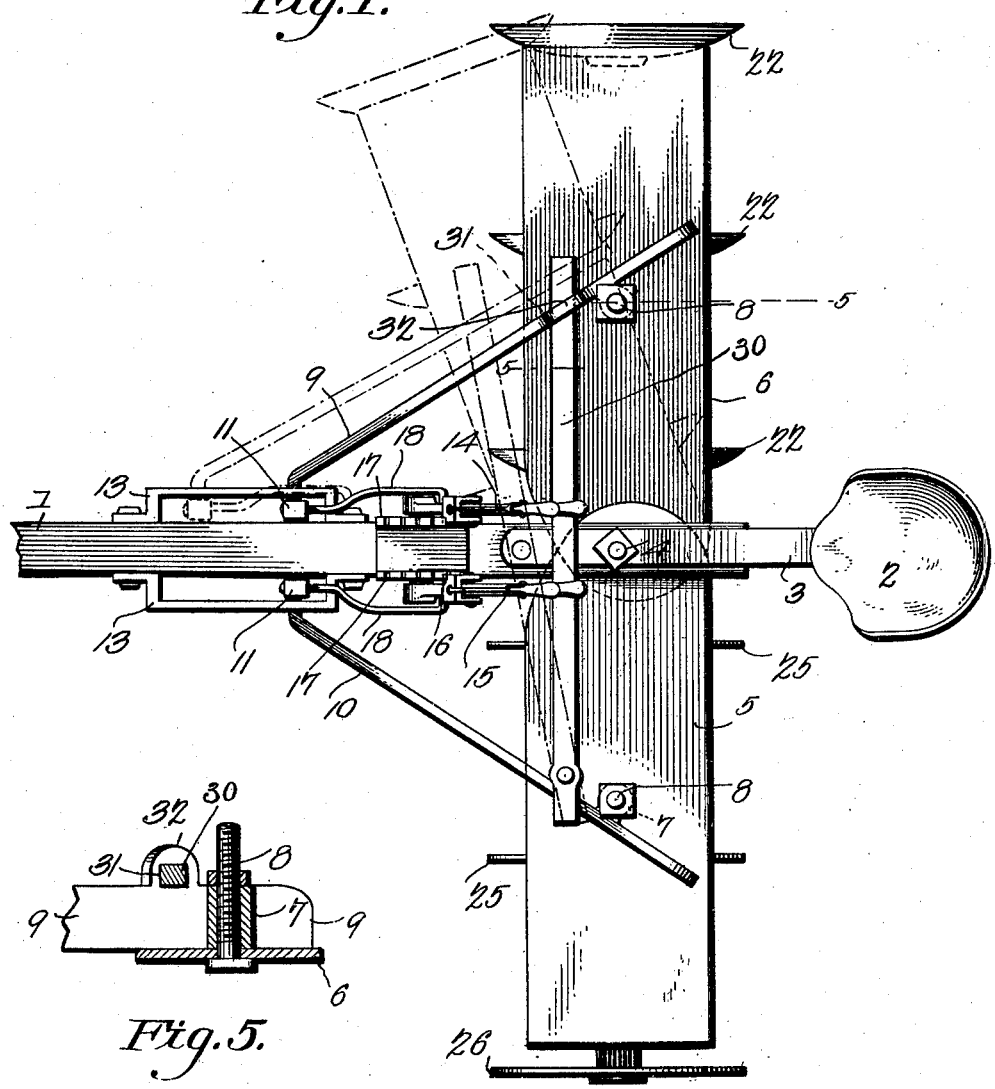

UNITED STATES PATENT OFFICE.

HUGH M. KING, OF OKLAUNION, TEXAS.

DISK PLOW.

SPECIFICATION forming part of Letters Patent No. 738,818, dated September 15, 1903.

Application filed June 15, 1903. Serial No. 161,588. (No model.)

*To all whom it may concern:*

Be it known that I, HUGH M. KING, a citizen of the United States, residing at Oklaunion, in the county of Wilbarger and State of Texas, have invented a new and useful Disk Plow, of which the following is a specification.

This invention relates to gang disk plows of that class in which a plurality of dished disks are mounted upon a single shaft or axle which may be set at various inclinations to the line of draft for the purpose of regulating the depth of the cut into the soil.

My present invention has for its object to provide a disk plow of this class in which all tendency to side draft shall be obviated, this being one of the serious objections in the use of this class of plows, which when set to penetrate deeply into the soil offer a resistance to the draft which usually results in their being thrown out of line.

A further object of my invention is to provide means whereby the gang of plows may be set in such a manner as to cause the inner and outer members of the gang to cut into the soil to an equal depth. Under usual circumstances the inner disks—that is, those nearest the line of draft—are apt to cut more deeply than the outer ones. By my invention I aim to so adjust the shaft carrying the disks that this objection shall be overcome, the plows at the outer end being simply set more deeply than those at the inner end, so that any tendency of the inner plows to cut more deeply shall be compensated for and equalized.

With these and other objects in view, all tending toward the production of a device of the class described which shall possess superior advantages in point of simplicity, durability, and general efficiency, my invention consists in the improved construction, arrangement, and combination of parts, which will be hereinafter fully described, and particularly pointed out in the claims.

In the accompanying drawings, Figure 1 is a top plan view of a gang disk plow constructed in accordance with the principles of my invention. Fig. 2 is a side elevation of the same. Fig. 3 is a rear elevation. Fig. 4 is a sectional view taken on the line 4 4 in Fig. 3. Fig. 5 is a sectional detail view taken on the line 5 5 in Fig. 1.

Corresponding parts in the several figures are indicated by similar numerals of reference.

I desire it to be understood at the outset that my invention is applicable to disk gang-plows having any number of disks. In the embodiment of the invention illustrated in the drawings hereto annexed I have shown a plow provided with three cutting-disks, this being known as a "three-gang plow." The three flat disks appearing at one side of the device are known as the "steering-disks," as will be presently more fully described.

1 designates the tongue, upon the rear end of which is mounted a seat 2, the standard or support 3 of which is pierced by a bolt 4, which extends through the tongue 1 and serves for the attachment to the under side of the latter of a pair of plates 5 and 6. These plates which are thus pivotally connected with the tongue are each provided with an upwardly-extending sleeve 7, through which extends a bolt 8. To the sleeves 7 are attached a pair of forwardly-converging braces 9 and 10, the front ends of which are provided with T-heads 11, working in slots 12 in the sides of keepers 13, secured upon the opposite sides of the tongue or beam. The latter is provided with oppositely-disposed hand-levers 14 and 15, fulcrumed on opposite sides thereof and provided with suitably-operated lock-dogs 16, adapted to engage toothed quadrants 17, connected with the tongue. These levers are connected by means of links 18 with the T-heads 11 on the respective braces 9 and 10, which may thus be manipulated so as to set the pivoted plates 6 and 7 at any desired angle or inclination to the tongue or beam.

One of the plates, in the present instance the plate 6, is provided on its under side with downwardly-extending curved brackets 19, carrying boxes 20, which serve to sustain a shaft 21, upon which a plurality of dished disks 22 are mounted. In the present example three such disks have been shown, the outer sides of said disks being concave and the concavo-convexity of said disks corresponding with the curves of the supporting-brackets 19. This is for the purpose of preventing the disks from engaging the said brackets frictionally, which in the absence of this special construction might be possible. The opposite plate 7 is provided with straight downwardly-extending brackets 23, supporting boxes 24, in which is journaled a shaft 25, carrying a plurality of flat disks 26, which I call the "steering-disks."

The boxes 20 and 24 may be constructed of wood and are held clamped by the supporting-brackets 19 and 23, which are provided with seats 27 for said boxes and with flanges 28 and clamping-plates 29, connected by bolts 30, whereby the said boxes may be tightened upon the shafts, each of said boxes being composed of two members grooved for the reception of the respective shafts.

The brace 10 is pivotally connected with a transversely-disposed rod 30, which extends through a perforation 31 in a lug 32, formed upon the opposite brace 9. It will thus be seen that by means of the braces 9 and 10 and the rod 30 the plates 6 and 7, carrying the disks, are suitably connected in any position to which they may be adjusted.

The operation of my invention will be readily understood. It will be seen that by means of the operating-lever 16 the plate 6, carrying the plow-disks, may be set to any desired degree of inclination with reference to the line of draft, thereby causing the plow-disks to cut deep or shallow, as may be desired. If the cut is shallow, the plate carrying the flat guiding or steering disks 26 may be suffered to remain practically at right angles to the line of draft, as indicated by the tongue. Should there be any tendency to side draft, this may be counteracted by properly adjusting the plate carrying the steering-disks at such an angle to the tongue that all tendency to side draft on the part of the dished plow-disks will be counteracted, as the plow will be caused to progress steadily in a straight forward direction.

Any tendency on the part of the inner plow-disks to cut more deeply into the ground than the outer ones may be overcome by properly adjusting the bolt 8, extending through the sleeve 7 of the plow-carrying plate 6 to lower the outer end of said plate, and thereby setting the outer disks lower than the inner ones. The extent of adjustment necessary to effect the proper equalization of the depth of cut of each disk may be readily ascertained by experimenting, and will of course be to some extent governed by the condition of the soil in which the machine is operated.

My improved plow is useful in operating in all kinds and in all conditions of soil. If the latter is soft and loamy, the operation will naturally be easy; but the excellent qualities of my improved plow will be best noted when it is applied to the cultivation of hard, baked, and dry soil, which is the usual condition of the soil in the semi-arid localities west of the Mississippi. In localities such as these and where large crops are invariably put in a plow that is useful for plowing only in moist and mellow land is entirely useless. The soil in order to enable the crops to be put in must be cultivated no matter what may be the condition thereof. Plows of ordinary construction will not operate successfully in land that is normally in the dry condition referred to above. It is true that they may be used occasionally; but they will not enable a man to put in the large acreage which under the circumstances is practicable and necessary. I have found, however, that by means of my improved plow herein described the land may be cultivated in the driest of seasons, thus effecting immense saving of time and vastly increasing the acreage that may be cultivated. It will be noted that the plow-disks will not merely cut into the soil and loosen the same in a lumpy condition, but they will turn the furrow-slices and break or pulverize the lumps under circumstances where most other plows would be found ineffectual. It is obvious that this is greatly due to the action of the steering-disks, which will precede the engagement with the soil of the plow-disks and which by cutting straight into the soil will greatly facilitate the operation of said plow-disks and enable them to perform the work assigned to them in a most thorough and satisfactory manner.

I have in the foregoing described a simple and preferred construction of my invention; but I desire it to be understood that I do not limit myself to the structural details of the same, but reserve the right to any changes, modifications, and alterations which may be resorted to within the scope of my invention and without departing from the spirit or sacrificing the utility of the same.

Having thus described my invention, I claim—

1. A gang disk plow comprising a tongue, plates connected pivotally with said tongue, brackets extending downwardly from said plates, boxings supported by said brackets, shafts journaled in said boxings, dished disks mounted upon the shaft carried by one of the plates, flat disks mounted upon the shaft carried by the other plate, and means for adjusting said plates independently of each other.

2. In a gang disk plow, a supporting-plate, brackets extending downwardly from the same and provided with supporting-seats and with clamping-plates, wooden boxings clamped and supported by said brackets, and a disk-carrying shaft journaled in said boxes.

3. In a gang disk plow, a pair of pivotally-connected plates, dished disks supported by one of said plates, flat disks supported by the other plate, a tongue or draft-beam connected with said plates at the pivotal connection of the latter, and means supported by said tongue for adjusting said plates and for retaining them at their desired adjustment.

4. In a gang disk plow, a pair of pivotally-connected plates, dished disks carried by one of said plates, flat disks carried by the other plate, a tongue pivotally connected with said plates at their point of connection, sleeves connected with said plates, brace-rods connected with said sleeves and having adjustable connection with the tongue, and adjusting means for said brace-rods.

5. In a gang disk plow, the combination with a tongue or draft-beam of pivotally-connected disk-carrying plates, sleeves connected pivotally and adjustably with said plates, brace-rods connected securely with said sleeves and having forwardly-converging ends slidably connected with the tongue, and means for adjusting and for retaining at the desired adjustment the front ends of said brace-rods.

6. In a gang disk plow, the combination of a tongue, disk-carrying plates pivotally connected with each other and with said tongue, sleeves connected adjustably and rotatably with said plates, adjusting-braces securely connected with said sleeves and having forwardly-converging ends terminating in T-heads, longitudinally-slotted keepers connected with the tongue and engaging the T-heads of said braces, adjusting-levers, and links connecting said levers independently with the T-heads of the respective brace-rods.

7. In a gang disk plow, the combination with a tongue, of disk-carrying plates pivotally connected with each other and with said tongue, braces connected adjustably with said plates and slidingly with said tongue, means for adjusting said braces and for retaining them at the desired adjustment, and a cross-bar pivotally connected with one of said braces and slidably connected with the other brace.

8. In a gang disk plow, the combination with a tongue, of a pair of disk-carrying plates pivotally connected with each other and with said tongue, one of said plates being provided with dished disks and the other with flat or steering disks, brace-bars connected pivotally and adjustably with said plates, converging forwardly and having sliding connection with the tongues, means for adjusting and for retaining at the desired adjustment said brace-rods, and a cross-brace suitably connecting the said brace-rods.

In testimony that I claim the foregoing as my own I have hereto affixed my signature in the presence of two witnesses.

HUGH M. KING.

Witnesses:
J. S. MASSIE,
F. L. MASSIE.